United States Patent Office 3,520,774
Patented July 14, 1970

3,520,774
EPICHLORODYDRIN-POLYETHYLENEIMINE WET STRENGTH ADDITIVE FOR PAPER
Harold H. Roth, Bay City, Mich., assignor to The Dow Chemical Company, Midland, Mich., a corporation of Delaware
No Drawing. Filed Sept. 28, 1967, Ser. No. 671,233
Int. Cl. C08g 23/12, 33/08
U.S. Cl. 162—164   6 Claims

ABSTRACT OF THE DISCLOSURE

An improved epihalohydrin - polyethylenimine wet strength additive for paper is prepared by reacting an aqueous solution of a polyethylenimine having a viscosity of about 8–40 cps. as a 20 percent aqueous solution at 23° C. with epihalohydrin to yield a water-soluble product containing about 0.8–1.0 mole epihalohydrin per polyethylenimine nitrogen and having a viscosity of about 7–50 cps. as a 25 percent aqueous solution at pH 7.0 and 23° C. The resulting aqueous solution is highly active as a wet strength additive.

BACKGROUND

In U.S. Pat. 2,272,489 Ulrich discloses numerous condensation products of alkylenimines and polyalkylenimines with varied alkylating agents including epichlorohydrin. Daniels and Landes U.S. Pat. 2,595,935 claims paper with a uniform content of about 0.5–4% of a cured thermosetting alkylenepolyamine-polyfunctional halohydrin resin. Green U.S. Pat. 2,969,302 claims the use of an alkylenepolyamine-epichlorohydrin resin as a retention aid in paper manufacture. British Pat. 1,008,464 discloses an aqueous solution of a polyalkylenimine reacted with epihalohydrin useful as a wet strength additive.

Yet in spite of favorable costs and the extensiv research indicated by this art, the only significant commercial paper additive derived from a polyamine is the polyamide resin Kymene 557. According to Kein U.S. Pat. 2,926,116, this resin is prepared by condensing an alkylenepolyamine, such as a diethylenetriamine, with a dibasic acid to form an aminopolyamide which is then further reacted with epichlorohydrin. The resulting polyamide resin is widely used as a wet strength additive for paper prepared from alkaline pulp.

STATEMENT OF THE INVENTION

A process has been discovered for preparing an improved polyethylenimine wet strength additive by reacting under controlled conditions an aqueous solution of a polyethylenimine having a particular viscosity with epihalohydrin to obtain a water-soluble product stable as a 20–25 weight percent aqueous solution. More specifically the process comprises reacting (A) an aqueous solution containing about 5–20 weight percent of a polyethylenimine having a viscosity of about 8.5–40 cps. as a 20 percent aqueous solution at 23° C. and (B) about 0.8–2.0 moles of epihalohydrin per polyethylenimine nitrogen to yield (C) an aqueous solution of a water-soluble epihalohydrin-polyethylenimine product having a viscosity of about 7–50 cps. as a 25 percent aqueous solution at pH 7.0 and 23° C. Preferably about 1.0–1.2 moles of epichlorohydrin per polyethylenimine nitrogen is added gradually to an aqueous solution of the polyethylenimine and reacted at about 10°–40° C. Also it has been found that the product uniformity and wet strength activity are enhanced when the aqueous polyethylenimine solution contains a small amount of sulfuric acid as an amine salt, preferably about 0.5–10 weight percent based on polyethylenimine.

By this control of the initial polyethylenimine viscosity and reaction conditions, a water-soluble polyethylenimine product is obtained that has superior wet strength activity over a broad range of pulp pH than prior polyethylenimine derivatives. At paper loadings of about 0.2–0.5 weight percent, an activity ranging from about 90–140% that of Kymene 557 polyamide resin has been obtained. The product is stable as a 20–25% aqueous solution and cures readily when the treated paper is dried. The treated paper has improved resistance to yellowing on aging. Other advantages of the wet strength additive prepared by this novel process include improved water solubility, good stabilty, shelf life and color, reduced foam and easier broking.

REACTANTS

A key factor in the improved process is the structure and molecular weight of the initial polyethylenimine (PEI) reactant as reflected in its aqueous solution viscosity. Because of the highly branched structure of PEI, correlation of the reactant and product molecular weight with the measured viscosity is poor. Hence the reactants and products are defined herein in terms of specific aqueous viscosities.

Required is a polyethylenimine having a viscosity of about 8.5–40 cps. and preferably about 8.5–20 cps. as a 20 percent aqueous solution at 23° C. Such a viscosity corresponds roughly to an average molecular weight of about 1,500;3,500 as determined ebulliometrically. The criticality of the PEI viscosity within this range in terms of improved wet strength activity has not been previously described.

The requisite PEI is preferably prepared by polymerization of ethylenimine. Suitable processes are described by Ulrich U.S. Pat. 2,182,306 and Wilson U.S. Pat. 3,203,910. Particularly desirable are polymers prepared from ethylenimine using sulfuric acid as catalyst. Alternately, a polyethylenepolyamine of a similar structure and viscosity prepared, for example, by increasing the molecular weight of a lower molecular weight PEI or ethylenepolyamine by reaction with a difunctional alkylating agent such as 1,2-dichloroethane or epichlorohydrin can be used.

Epichlorohydrin is preferred as the second reactant although epibromohydrin can also be used. Under appropriate conditions the epichlorohydrin can be formed in situ from 1,3-dichloro-2-propanol and base.

Sufficient epihalohydrin must be added to yield a stable water-soluble polymer containing about 0.8–1.0 moles of reacted epihalohydrin per PEI nitrogen. Normally about 0.8–2.0, and preferably about 1.0–1.2 moles of epichlorohydrin are used. A larger excess can be added, but is generally not required to achieve the desired degree of substitution. With less than 0.8 mole of epihalohydrin, the product solubility and stability in aqueous solution markedly decreases.

Under the reaction conditions described below, the epihalohydrin is believed to react rapidly and preferentially through its epoxide group with the amino nitrogen of the PEI to give a stable water-soluble polymer in which the nitrogens are largely substituted with halohydrin groups as shown by the formula:

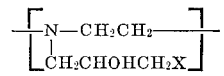

where X is Br or Cl.

In a neutral or weakly acidic aqueous solution, e.g. at about pH 3–7.5, the water-soluble product is largely present in this stable halohydrin form. But if the solution becomes alkaline, the halohydrin groups are converted into expoxide form with subsequent rapid crosslinking and insolubilization.

This reaction of PEI and epihalohydrin is also influenced, as shown by a greater uniformity in product activity, by the presence of a small amount of sulfuric acid as an amine salt, either as residual catalyst from the ethylenimine polymerization or as sulfuric acid added to the PEI. Its exact function is not known. However, it appears to reduce crosslinking through primary amino groups and thus enhance the water solubility of the product. The amount of sulfuric acid can range from about 0.5–10 weight percent based on PEI, preferably about 2–6 percent.

REACTION CONDITIONS

To obtain a water-soluble product as a stable moderately concentrated aqueous solution, the epihalohydrin is preferably added gradually to the aqueous PEI over about 0.5–2.0 hrs. A reaction temperature of about 10°–40° C. is highly desirable during the addition and major portion of the reaction to minimize crosslinking and formation of insoluble gels. Water is the preferred reaction medium, but other aqueous solvents such as aqueous isopropanol or glycol ether capable of dissolving the desired 15–25 percent of the epihalodrin-PEI product can be used. The reactants are stirred at about 10–40° C. for 1–4 hrs. or more after complete addition to achieve high conversion.

Under these conditions the epihalohydrin rapidly reacts with the PEI nitrogen to form the substituent halohydrin group shown above. If sufficient epihalohydrin is used to give a product containing about 0.8–1.0 moles of reacted epihalohydrin per PEI nitrogen, the aqueous solution becomes nearly neutral so that further reaction of the halohydrin group and gelation is effectively eliminated.

Then the aqueous solution can be heated at about 40°–100° C. to remove haziness caused by residual epihalohydrin giving a clear solution of a water-soluble product having a viscosity of about 7–50 as a 25 percent aqueous solution at pH 7.0 and 23° C. The solution is then cooled and if necessary the pH adjusted to about 3–7.5, preferably about 5–7. The resulting solution containing 15–30 weight percent of the improved epihalohydrin-PEI wet strength additive is stable for an extended time at room temperature. However, heating the solution to dryness or making it strongly basic rapidly transforms the product into a water-insoluble resin.

PAPER TREATMENT

The cationic epihalohydrin-PEI product is readily absorbed by cellulose fiber. It is preferably added to a pulp slurry at the beater, stock chest, head box or other point which permits adequate mixing prior to formation of the paper sheet on the screen. The paper pulp may be any conventional pulp including chemically and mechanically produced wood pulp, rag pulp and similar cellulosic fibers. The modified Epi-PEI, although effective over a wide pH range, is particularly useful with alkaline pulps which cannot be treated with melamine or urea-formaldehyde resins.

Alternately preformed paper sheets can be sprayed or dipped in an aqueous epihalohydrin-PEI solution.

The amount of additive applied depends both on the specific pulp and the desired wet strength. Useful wet strength improvement is obtained with about 0.1–5 weight percent of the epihalohydrin-PEI additive based on dry pulp weight. Optimum performance is generally obtained with a loading of about 0.2–1.0 weight percent.

After treating the pulp or paper with the aqueous epihalohydrin-PEI solution, the usual paper drying cycle at 50°–150° C. transforms the additive into a water-insoluble resin which imparts increased wet strength to the treated paper.

The following examples illustrate further this invention. Unless otherwise specified, all parts and percentages are by weight.

EXAMPLE 1

Improved Epi-PEI product

In the following runs a polyethylenimine (PEI) prepared by an acid catalyzed polymerization of ethylenimine was used. This PEI contains about 20–30% tertiary nitrogen with a branching ratio (B.R.) of about 3.0–3.4 as calculated from the formula:

$$B.R.=\Sigma(2°N+3°N)/1°N$$

The values for secondary, tertiary and primary nitrogen are determined by standard analytical methods.

(A) An aqueous solution containing 109.5 parts water of a 20% aqueous PEI obtained by polymerization of and 11.5 parts (0.27 mole) PEI was prepared by dilution of a 20% aqueous PEI obtained by polymerization of ethylenimine in aqueous solution using 1% $H_2SO_4$ as catalyst and having a viscosity of 10.7 cps. at 23° C. To this stirred 9.5% PEI solution was added dropwise at room temperature over about 2 hrs. 25.0 parts (0.27 mole) of epichlorohydrin. The temperature during the addition and the subsequent 2 hr. reaction period was held at about 24° C. Then the slightly hazy solution containing 25% solids was heated at 50° C. for 1 hr. to yield a clear stable aqueous solution having a pH of 7.4 and a Brookfield viscosity of 10.4 cps. at 23° C.

To evaluate the wet strength activity of the Epi-PEI products described herein, standard test sheets are prepared using an unbleached western softwood sulfite paper furnish prepared with a Canadian Standard Freeness (CSF) of 400 by Tappi Method T–200 and adjusted to pH 7.0. After blending the additive with the pulp, test sheets are formed on a Noble and Wood hand sheet machine by the general method of Tappi T–205M–1960. The test sheets are cured for 30 min. at 110° C. and then conditioned at room temperature. Standard 15 x 203 mm. test strips are cut, soaked in water for 1 hr. at room temperature, blotted and the wet breaking length measured at 73° F. (22.8° C.) and 50% RH with an Instrom Universal Test Machine (Tappi Method T–404). Test sheets prepared using the commercial polyamide wet strength resin, Kymene 557 (Hercules Inc.) are used as a standard for comparison. A loading of 0.5% is generally acceptable for preliminary evaluation.

Typical results with the improved Epi-PEI product (10.4 cps., 25%23° C.) are given in Table 1.

TABLE 1.—WET BREAKING LENGTH (WBL)

| Additive | Loading, percent | WBL, m. | Activity A, percent |
|---|---|---|---|
| Epi-PEI, 10.4 cps | 0.25 | 871 | 140 |
| | 0.50 | 1,369 | 120 |
| Kymene 557 polyamide resin | 0.25 | 618 | 100 |
| | 0.50 | 1,144 | 100 |

A Based on Kymene 557 polyamide resin at the same loading.

(B) To 84 parts water and 11.5 parts (0.27 mole) of PEI prepared by acid catalyzed polymerization of anhydrous ethylenimine and having a viscosity of 9 cps. (20%/23° C.) was adde dropwise at 25–35° C. 25 parts (0.27 mole) epichlorohydrin over 1 hr. After stirring another 1.25 hr. at 25–35° C., the cloudy solution was heated at 50° C. for 0.75 hr. to yield a crystal clear solution having a pH of 7.1 and containing 30% solids. Diluted to 25%, the product solution had a Brookfield viscosity of 8.6 cps. Its wet strength activity was about 95% at a 0.5% loading. After 40 days at room temperature the 25% solution was still gel free with a viscosity of 9.0 cps. and an activity at about 98%. After 4 months at room temperature its activity was 93%.

(C/D) Two series of Epi-PEI additives prepared and tested by the general methods of Example 1A are presented in Table 2 to illustrate the criticality of the initial PEI viscosity. In Series 1C the additives with an initial viscosity within the optimum range have a wet strength activity ranging from about 90–130% based on the activity of Kymene 557. In Series 1D the additives with viscosities outside the claimed range have relative activities of less than 85%. As shown by Runs 1D–4 and –5 the final product viscosity is a further important factor.

TABLE 2.—INITIAL PEI VISCOSITY

| Additive: | Initial PEI Visc. 20%/23° C.; 1%/25° C. | Epi-PEI product visc. 25%/23° C.; 1%/25° C. | Activity at 0.5% loading percent |
|---|---|---|---|
| 1A–1 | 10.7 cps. 0.994 cks | 10.4 cps | 120 |
| 1C–1 | 8.8 cps. 0.966 cks | 8.6 cps. 0.982 cks | 89 |
| 1C–2 | 8.8 cps. 0.966 cks | 13.5 cps | 100 |
| 1C–3 | 9.6 cps | 9.1 cps. 1.040 cks | 110 |
| 1C–4 | 10.7 cps. 0.994 cks | 21.0 cps | 107 |
| 1C–5 | 12.9 cps | 13.5 cps | 114 |
| 1C–6 | 14.1 cps. 1.007 cks | 12.3 cps. 1.100 cks | 127 |
| 1C–7 | 15.0 cps | 17.0 cps | 100 |
| 1D–1 | 5.7 cps | | 37 |
| 1D–2 | 6.9 cps | 6.2 cps. 0.974 cks | 78 |
| 1D–3 | 7.6 cps | 6.7 cps. 0.969 cks | 84 |
| 1D–4 | 8.8 cps. 0.996 cks | 88.0 cps. 1.483 cks | 83 |
| 1D–5 | 14.1 cps. 1.007 cks | 63.0 cps.* 1.288 cks | 73 |
| 1D–6 | 45.0 cps | (11 cps./15%) | 84 |
| 1D–7 | 146 cps. 1.428 cks | (10 cps./15%) | 82 |
| 1D–8 | 770 cps | (11 cps./15%) | 80 |

(E) To an aqueous solution containing 37.8 parts (0.2 mole) of tetraethylenepentamine (MW 189) was added 35.5 parts (0.38 mole) of epichlorohydrin by the procedue of Daniels e.a. U.S. Pat. 2,595,935. The final aqueous solution had a 15% viscosity of 8.8 cps. at pH 8.2. Its wet strength activity by the method of Example 1A was 53% at 0.5% loading.

(F) A 20% aqueous solution of a polyethylenimine having a viscosity of 5.7 cps. (M.W.~300) was prereacted at room temperature with 0.3 mole of epichlorohydrin/PEI nitrogen to increase its viscosity to 10.8 cps. (20%/23° C). This product was then reacted as described in 1A with an additional 0.7 mole of epichlorohydrin/PEI nitrogen to yield an Epi-PEI product with a viscosity of 19 cps. (25%/23° C.) and a wet strength activity of 88% at 0.5% loading.

EXAMPLE 2

Epi-PEI reaction conditions (A) A series of runs was made with 10.7 cps. PEI (20%/23° C.) to examine the effect of Epi/PEI reactant ratio on the product activity. Typical results shown in Table 3 indicate that a ratio of at least 0.8 mole Epi/PEI nitrogen is required for a stable water-soluble product and that maximum activity is achieved by reacting about 1.0 mole Epi/PEI nitrogen. In practice a slight excess of Epi, e.g. about 1.0–1.2 mole Epi/PEI nitrogen, is preferably used to insure complete reaction.

TABLE 3
Epi/PEI ratio

| Mols Epi/PEI nitrogen: | Percent activity |
|---|---|
| 0.7 | [1] 107 |
| 0.8 | 85 |
| 1.1 | 94 |
| 1.2 | 90 |
| 1.5 | 102 |

[1] Product gelled overnight.

(B) The effect of Epi-PEI reaction temperature is shown in Table 4 using about 1 mole Epi/PEI nitrogen. The marked increase in product viscosity following observation in reaction at 0°–10° C. is both unexpected and undesired for an active water-soluble product. The temperature control between about 10°–40° C. is particularly critical with higher PEI concentrations and viscosities.

TABLE 4.—REACTION TEMPERATURE

| | Reaction T.° C. | | | | | |
|---|---|---|---|---|---|---|
| | 0° | 12° | 20° | 25° | 30° | 40° |
| 4B–1 10.7 cps. PEI: | | | | | | |
| Product visc., cps (25%/T.° C.) | 13.1 | 12.2 | 11.4 | 10.4 | 9.9 | 12.1 |
| Percent activity | 105 | 108 | 105 | 120 | 92 | 84 |
| 4B–2 12.9 cps. PEI: | | | | | | |
| Product visc., cps. (25%/T.° C.) | 280 | 56 | 19.4 | 13.5 | | |
| Percent activity | 88 | 99 | 106 | 114 | | |
| 4B–3 14.1 cps. PEI: | | | | | | |
| Product visc., cps. (25%/T.° C.) | 1,700 | | 23.7 | 12.3 | 12.3 | 16.9 |
| Percent activity | | | 103 | 127 | 92 | 90 |

(C) The effect of $H_2SO_4$, present as an amine sulfate, on the Epi-PEI reaction is more evident in the consistency and uniformity of the resulting product than in increased activity. But modest improvements in activity have ben observed as shown in Table 5. Such an improvement has not been observed with other acid catalysts for EI including HCl and $H_3PO_4$. Particularly suitable for preparing the improved wet strength additive is a PEI of optimum viscosity prepared by polymerization of EI in the presence of $H_2SO_4$.

TABLE 5.—EFFECT OF $H_2SO_4$ ON EPI-PEI REACTION

| PEI | | | |
|---|---|---|---|
| Catalyst | Visc. 20%/23° C. | Percent $H_2SO_4$ [a] | Percent Activity |
| HCl | 8.8 cps | 0 | 89, 92, 99 |
| | | 1 | 101, 105 |
| | | 3 | 98, 103, 104 |
| | | 6 | 101, 103 |

[a] Added to aqueous PEI before addition of Epi.

(D) The improved process is particularly advantageous in preparing moderately concentrated aqueous product solutions. By reacting 5–15% aqueous PEI at 10°–40° C. with about 1 mole of Epi, stable solutions containing about 15–35% active solids can be prepared. However, for long term storage, an aqueous Epi-PEI product concentration of about 15–30% is preferred.

I claim:
1. In a process for preparing an epihalohydrinpolyethylenimine wet strength additive, the improvement which comprises: Reacting
   (A) An aqueous solution containing about 5–20 weight percent of a polyethylenimine having a viscosity of about 8.5–40 cps. as a 20 percent aqueous solution at 230° C., and
   (B) About 0.8–2.0 moles of epichlorohydrin per polyethylenimine nitrogen to yield
   (C) An aqueous solution of a water-soluble epichlorohydrin-polyethylenimine product having a viscosity of about 7–50 cps. as a 25 percent aqueous solution at pH 7.0 and 23° C.
2. The process of claim 1 where about 1.0–1.2 moles of epichlorohydrin per polyethylenimine nitrogen is added gradually to the aqueous polyethylenimine solution and reacted at about 10°–40° C. until the desired aqueous product viscosity is obtained.
3. The process of claim 1 where the polyethylenimine has a viscosity of about 8.5–20 cps. as a 20 percent aqueous solution at 23°C.
4. The process of claim 1 where the product solution contains about 15–30 weight percent of the epichlorohydrinpolyethylenimine.
5. A polyethylenimine wet strength additive prepared by the process of claim 1.

6. A paper containing from about 0.1–5 weight percent base on dry pulp weight of a polyethylenimine wet strength additive prepared by the process of claim 1.

References Cited

UNITED STATES PATENTS

| | | | |
|---|---|---|---|
| 2,182,306 | 12/1939 | Ulrich | 260—239 |
| 2,272,489 | 2/1942 | Ulrich | 260—239 |
| 2,296,225 | 9/1942 | Ulrich | 260—239 |
| 2,595,935 | 5/1952 | Daniel et al. | 92—3 |
| 2,601,597 | 6/1952 | Daniel et al. | 92—21 |
| 2,849,411 | 8/1958 | Lehmann et al. | 260—29.2 |
| 2,969,302 | 1/1961 | Green | 162—164 |

FOREIGN PATENTS 1,020,811  2/1966  Great Britain.

WILLIAM H. SHORT, Primary Examiner

E. A. NIELSEN, Assistant Examiner

U.S. Cl. X.R.

260—2, 29.2

PO-1050
(5/69)

UNITED STATES PATENT OFFICE
CERTIFICATE OF CORRECTION

Patent No. 3,520,774          Dated July 14, 1970

Inventor(s) Harold H. Roth

It is certified that error appears in the above-identified patent and that said Letters Patent are hereby corrected as shown below:

Column 1, line 30, delete "0.5-4%" and insert --0.5-5%--;
Column 1, line 37, delete "extensiv" and insert --extensive--;
Column 2, line 29, delete "1,500;3,500" and insert --1,500-3,500--;
Column 2, line 41, delete "difunctional" and insert --difunctioned--;
Column 3, line 24, delete "epihalodrin-" and insert --epihalohydrin- --;
Column 4, cancel line 16 starting with "of a";
Column 4, line 62, delete "adde" and insert --added--;
Column 6, line 56, delete "230" and insert --23--;
Column 1, line 2, delete "EPICHLORODYDRIN-" and insert --EPICHLOROHYDRIN- --.

SIGNED AND
SEALED
NOV 10 1970

(SEAL)
Attest:

Edward M. Fletcher, Jr.
Attesting Officer

WILLIAM E. SCHUYLER, JR.
Commissioner of Patents